(12) United States Patent
Scheffel et al.

(10) Patent No.: US 12,092,185 B2
(45) Date of Patent: Sep. 17, 2024

(54) SINGLE AXIS HARMONIC ABSORBER FOR CANTILEVER STRUCTURE

(71) Applicant: Siemens Medical Solutions USA, Inc., Malvern, PA (US)

(72) Inventors: Andrew Scheffel, Arlington Heights, IL (US); Monica Beeferman, Great Neck, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 559 days.

(21) Appl. No.: 17/309,379

(22) PCT Filed: Jan. 18, 2019

(86) PCT No.: PCT/US2019/014193
§ 371 (c)(1),
(2) Date: May 24, 2021

(87) PCT Pub. No.: WO2020/149851
PCT Pub. Date: Jul. 23, 2020

(65) Prior Publication Data
US 2022/0034380 A1    Feb. 3, 2022

(51) Int. Cl.
*F16F 7/10*     (2006.01)
*F16M 11/14*    (2006.01)
*F16M 11/20*    (2006.01)
*F16M 13/02*    (2006.01)

(52) U.S. Cl.
CPC ........... *F16F 7/1028* (2013.01); *F16M 11/14* (2013.01); *F16M 11/2014* (2013.01); *F16M 13/02* (2013.01); *F16M 2200/04* (2013.01)

(58) Field of Classification Search
CPC ....... F16F 7/1028; F16M 11/14; F16M 11/00; F16M 2200/04; F16M 13/02; F16M 11/2014
See application file for complete search history.

(56) References Cited

U.S. PATENT DOCUMENTS

| 4,625,731 | A |   | 12/1986 | Quedens et al. |
|-----------|---|---|---------|----------------|
| 4,679,223 | A |   | 7/1987  | Ohlson et al.  |
| D323,323  | S | * | 1/1992  | Klabel ........................ D14/114 |
| 5,119,203 | A | * | 6/1992  | Hosaka ............... H04N 23/531 348/E5.025 |
| 5,915,508 | A |   | 6/1999  | Lai            |

(Continued)

FOREIGN PATENT DOCUMENTS

| CN | 1319180 A | 10/2001 |
|----|-----------|---------|
| CN | 1572548 A | 2/2005  |

(Continued)

OTHER PUBLICATIONS

International Search Report for Corresponding International Application No. PCT/US2019/014193, mailed Apr. 10, 2019.

*Primary Examiner* — Pamela Rodriguez (57) ABSTRACT

A system comprises a cantilever structure and a harmonic absorber. The cantilever structure is anchored at an anchor end and connected to a device at a distal end. Use of the device imparts vibrations in the cantilever structure. The harmonic absorber is located at the distal end of the cantilever structure. The harmonic absorber is tuned to a structural frequency of the cantilever structure such that the vibrations in the cantilever structure are damped.

19 Claims, 6 Drawing Sheets

(56) References Cited

U.S. PATENT DOCUMENTS

| | | | |
|---|---|---|---|
| D507,477 S * | 7/2005 | Pfister | D14/451 |
| 7,775,485 B2 * | 8/2010 | Asai | A61B 8/462 |
| | | | 248/125.7 |
| 2010/0057260 A1 | 3/2010 | Fallahi | |
| 2011/0193277 A1 | 8/2011 | Christenson | |
| 2011/0195794 A1 | 8/2011 | Bai et al. | |
| 2012/0080612 A1 | 4/2012 | Grego et al. | |
| 2012/0280892 A1 | 11/2012 | Moscovitch | |
| 2014/0093048 A1 | 4/2014 | Kropp et al. | |
| 2016/0174914 A1 | 6/2016 | Lerch et al. | |
| 2018/0071047 A1 | 3/2018 | Suzuki et al. | |

FOREIGN PATENT DOCUMENTS

| | | | |
|---|---|---|---|
| CN | 1838317 A | 9/2006 | |
| CN | 2889173 Y | 4/2007 | |
| CN | 205144584 U | 10/2015 | |
| CN | 204924254 U | 12/2015 | |
| CN | 108697396 A | 10/2018 | |
| CN | 107638186 A | 8/2023 | |
| KR | 20140089254 A | 7/2014 | |

\* cited by examiner

SINGLE AXIS HARMONIC ABSORBER FOR CANTILEVER STRUCTURE

TECHNICAL FIELD

The present invention relates generally to a single axis harmonic absorber for cantilever structure. The harmonic absorber may be used, for example, to dampen vibrations of the cantilever structure caused by use of device connected to the structure.

BACKGROUND

Imaging scanners such as single-photon emission computerized tomography (SPECT) have a cantilevered gantry display monitor assembly anchored at the top of the scanner. The cantilevered gantry display monitor assembly holds a touchscreen display that allows user interaction with the scanner during its operation. However, user interaction with the touchscreen display, as well as other system motion, causes prolonged oscillations in the cantilevered gantry display monitor assembly. In turn, these oscillations make it difficult to read and operate the touchscreen display.

Conventional solutions to cantilevered structure vibrations on medical systems have been addressed primarily via alterations to the cross-section geometry of the cantilevered arm or supplementary gussets. These solutions merely change the stiffness of the structure which only affects the nature of the vibration but does not counteract its propagation.

SUMMARY

Embodiments of the present invention address and overcome one or more of the above shortcomings and drawbacks, by providing methods, systems, and apparatuses related to a single axis harmonic absorber for reducing vibrations in a cantilever structure.

According to some embodiments, a system comprises a cantilever structure and a harmonic absorber. The cantilever structure is anchored at an anchor end and connected to a device at a distal end. Use of the device imparts vibrations in the cantilever structure. The harmonic absorber is located at the distal end of the cantilever structure. The harmonic absorber is tuned to a structural frequency of the cantilever structure such that the vibrations in the cantilever structure are damped.

In other embodiments of the present invention, a system for dampening vibrations in a cantilevered structure comprises a single axis harmonic absorber. The single axis harmonic absorber is positioned inside the cantilevered structure, and it comprises a mass, a spring, and a guide rod to position the mass with respect to the center of the spring. The axis harmonic absorber is tuned to a structural frequency of the tubular cantilever structure such that the vibrations in the tubular cantilever structure are damped.

In other embodiments, a system comprises an imaging device, a cantilever structure anchored to the imaging device, and a harmonic absorber connected to the cantilever structure. The harmonic absorber is tuned to a structural frequency of the cantilever structure such that the vibrations in the cantilever structure are damped.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to a harmonic absorber for a cantilever structure. As is generally understood in the art, mechanical structures inherently have mass, stiffness, and damping that can be calculated and/or measured to derive the object's natural frequency. According to various embodiments described in detail below, a harmonic absorber (also known as a tuned mass damper) is integrated into the cantilever structure. In some embodiments, this harmonic absorber comprises a mass and spring pair with a precise ratio of mass to stiffness that counters the structure's frequency and, thus, reduces or eliminates vibration in the structure. In other embodiments, other types of harmonic absorbers may be employed (e.g., contained liquid volumes). In systems where the cantilever structure is connected to a user interface, the harmonic absorber reduces or eliminates vibration of the interface, thereby improving ergonomics and usability of the overall system.

Figure 1:
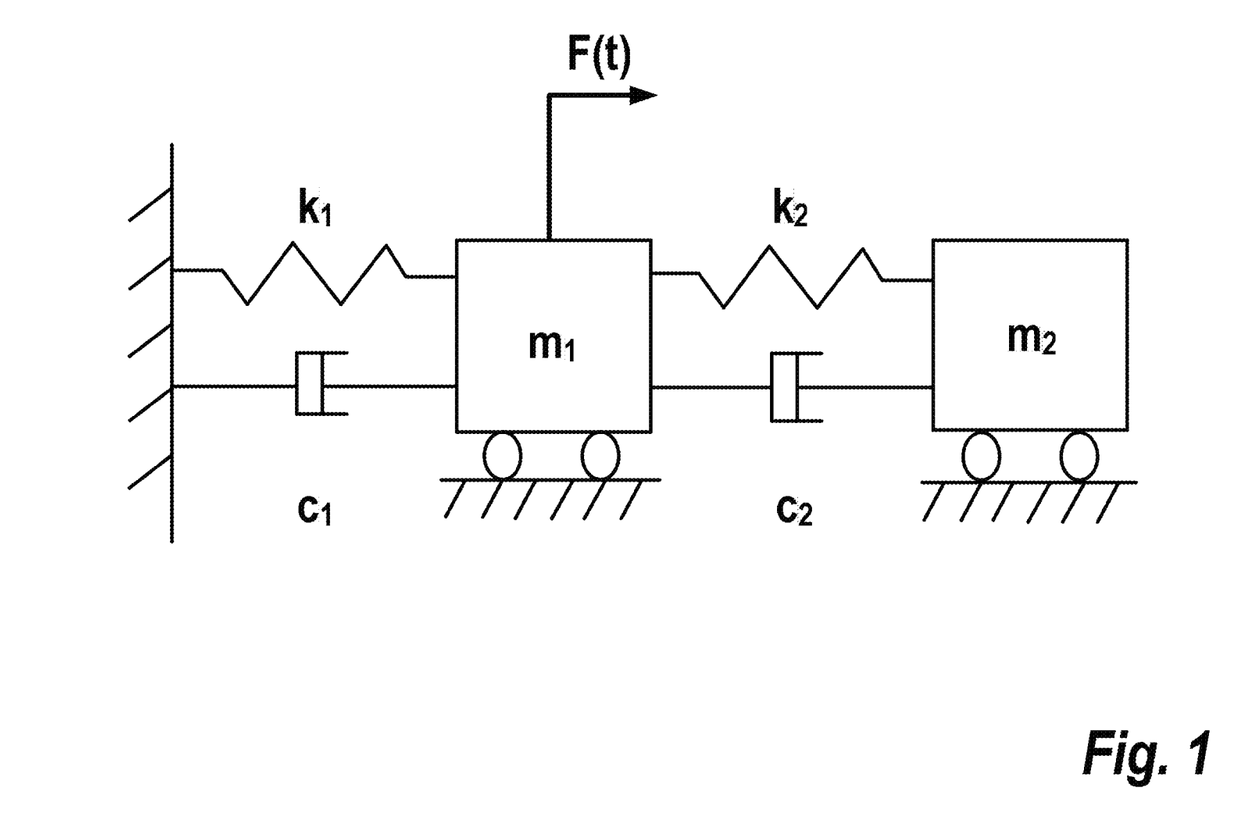
FIG. 1 provides a conceptual view of how a harmonic absorber can reduce vibrations in a cantilevered structure.

FIG. 1 provides a conceptual view of how a harmonic absorber can reduce vibrations in a cantilevered structure. In this example, there are two spring-mass-damper systems. The first spring-mass-damper system is characterized by a mass $m_1$, a stiffness $k_1$, and a damping coefficient $c_1$, while the second spring-mass-damper system is characterized by a mass $m_2$, a stiffness $k_2$, and a damping coefficient $c_2$. The second spring-mass-damper system is referred to herein as a "tuned-mass-damper" or a "harmonic absorber." The values of $m_2$, $k_2$, and $c_2$ are selected or "tuned" to a particular resonant frequency that counteracts mechanical vibrations that may occur within the first spring-mass-damper system. In the absence of the harmonic absorber, the force F(t) displacing the first spring-mass-damper system will cause the first spring-mass-damper system to oscillate until energy is fully dissipated. However, with harmonic absorber, these oscillations are minimized or eliminated altogether.

Continuing with reference to FIG. 1, the first spring-mass-damper system can be analogized to a cantilevered structure. As is understood in the art, a cantilevered structure is a rigid structural element anchored at one end to a support. The natural frequency of the cantilevered structure will depend on a variety of factors such as the dimensions of the structure, the modulus of rigidity of the material used to construct the structure, the moment of inertia of the structure's cross-section, etc. If a force is applied to the cantilevered structure, the structure will tend to vibrate at this frequency until energy is dissipated. The harmonic absorber described herein acts in a manner similar to the harmonic absorber described above. That is, the harmonic absorber is tuned to the natural frequency of the cantilevered structure such that the vibrations are reduced or eliminated.

Figure 2A:
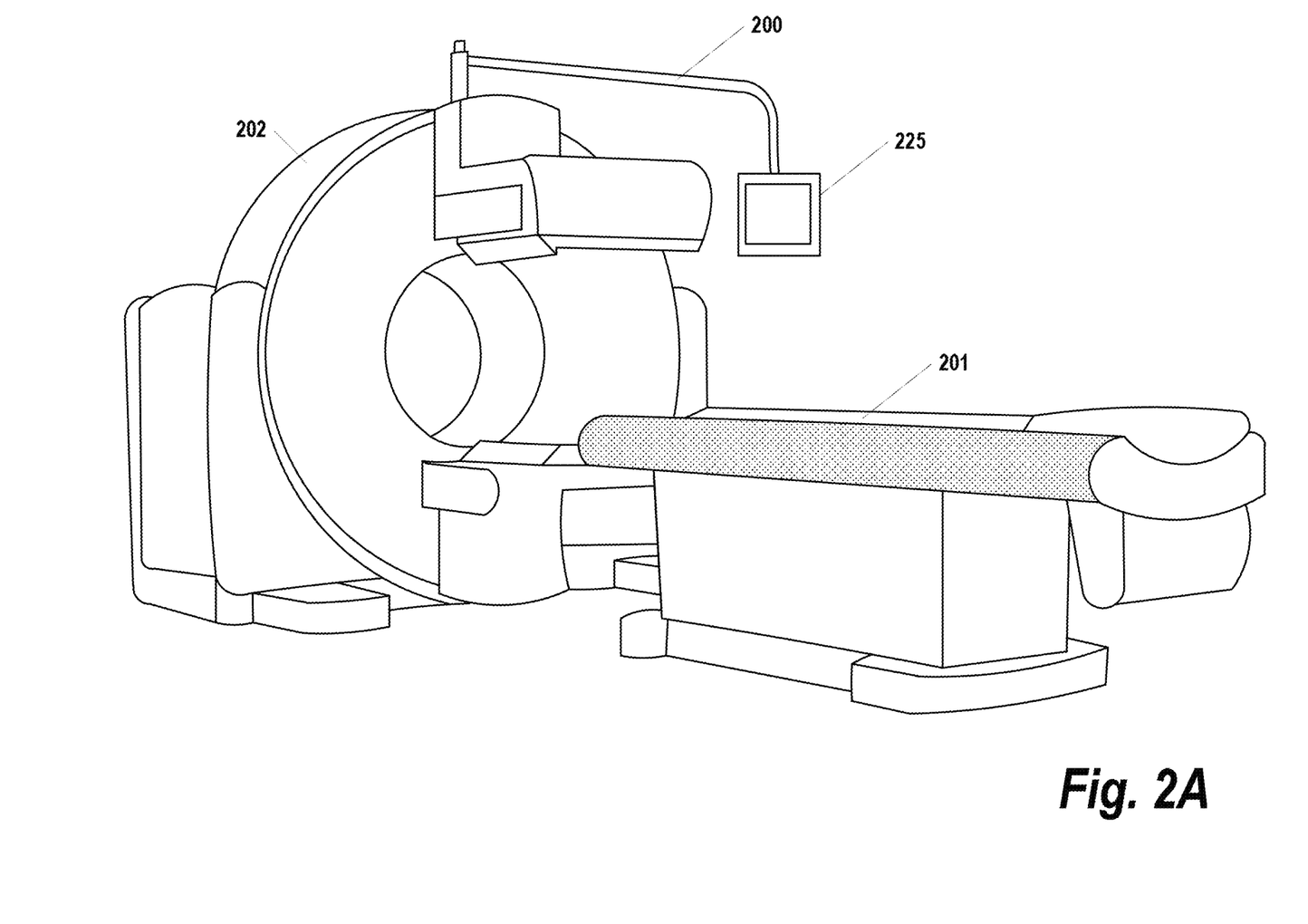
FIG. 2A shows an example cantilever structure anchored to an imaging system, according to some embodiments.

FIG. 2A shows an example Cantilever Structure 200 anchored to an Imaging System 202, according to some embodiments. In this example, the Imaging System 202 is a single photon emission computed tomography (SPECT) system; however it should be understood that any imaging system known in the art may be used with the Cantilever Structure 200 including, without limitation, MRI, Computed Tomography (CT), and positron emission tomography (PET) imaging systems. As shown in the image, a Monitor Assembly 225 is attached to the Cantilever Structure 200. During imaging, a subject is positioned on the Bed 201. The Bed 201 is then moved into the Imaging System 202. The operator uses the Monitor Assembly 225 to enter commands for performing imaging operations (e.g., starting imaging, selecting imaging parameters, etc.).

Figure 2B:
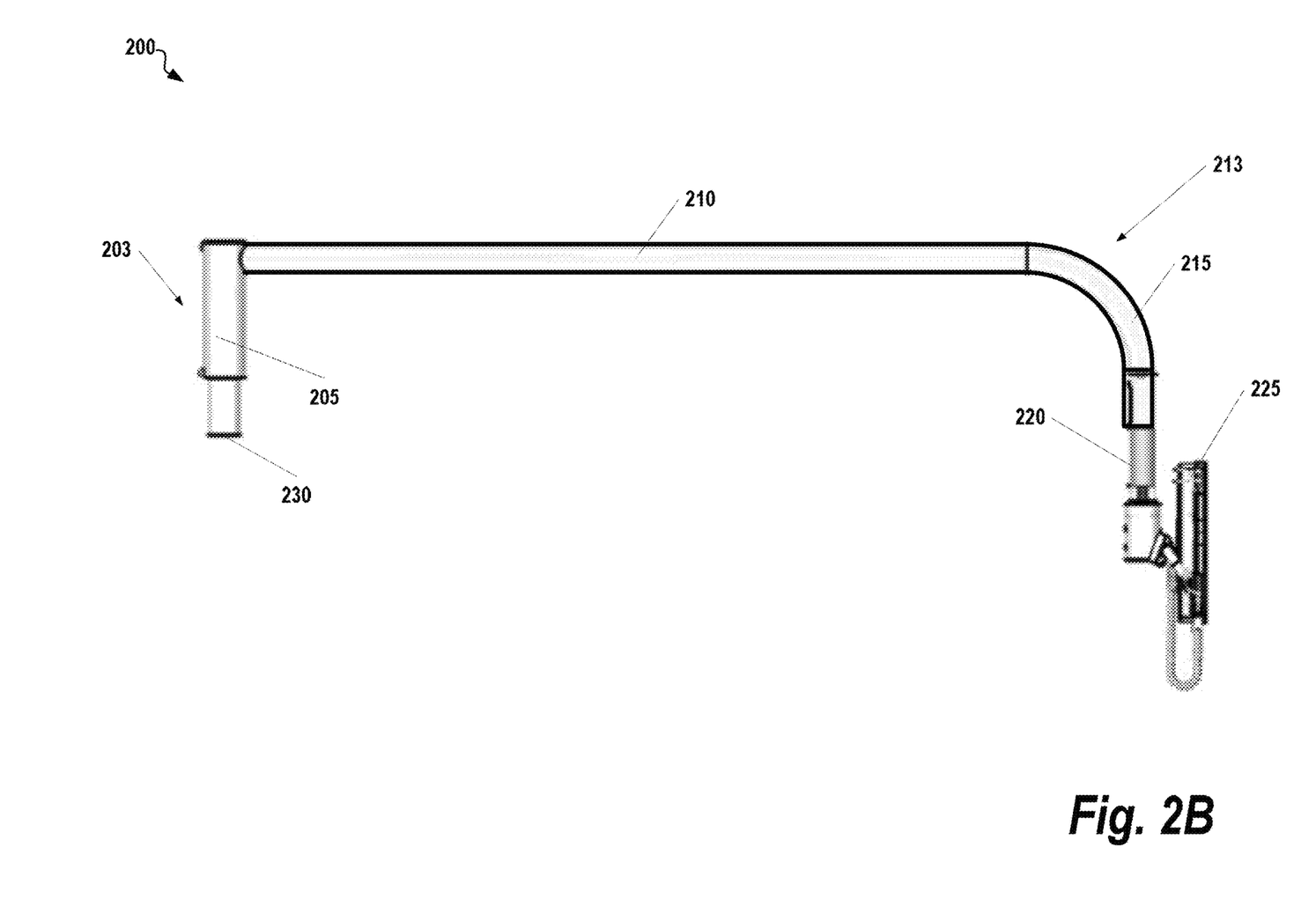
FIG. 2B provides a more detailed view of the cantilever structure shown in FIG. 2A.

FIG. 2B provides a more detailed view of the Cantilever Structure 200 shown in FIG. 2A. An Anchor Section 205 is located at the Anchor End 203 of the Cantilever Structure 200, extending in a vertical direction with respect to the Imaging System 202 (shown in FIG. 2A). This anchor section is connected to an upper exterior surface of the Imaging System 202 at an Anchor Point 230. A Monitor Assembly 225 is a located at the Distal End 213 of the Cantilever Structure 200. Users can rotate that Cantilever Structure 200 around the Anchor Point 230 in order to position the Monitor Assembly 225 as desired during operation of the Imaging System 202.

Continuing with reference to FIG. 2B, a Horizontal Section 210 is connected to the Anchor Section 205 to allow the Cantilever Structure 200 to extend away from the Imaging System 202 for accessibility. A Curved Boom Arm Section 215 is connected to the Horizontal Section 210 and located at the Distal End 213 of the Cantilever Structure 200. A Harmonic Absorber 220 is positioned internal to (i.e., inside) the Curved Boom Arm Section 215.

Figure 2C:
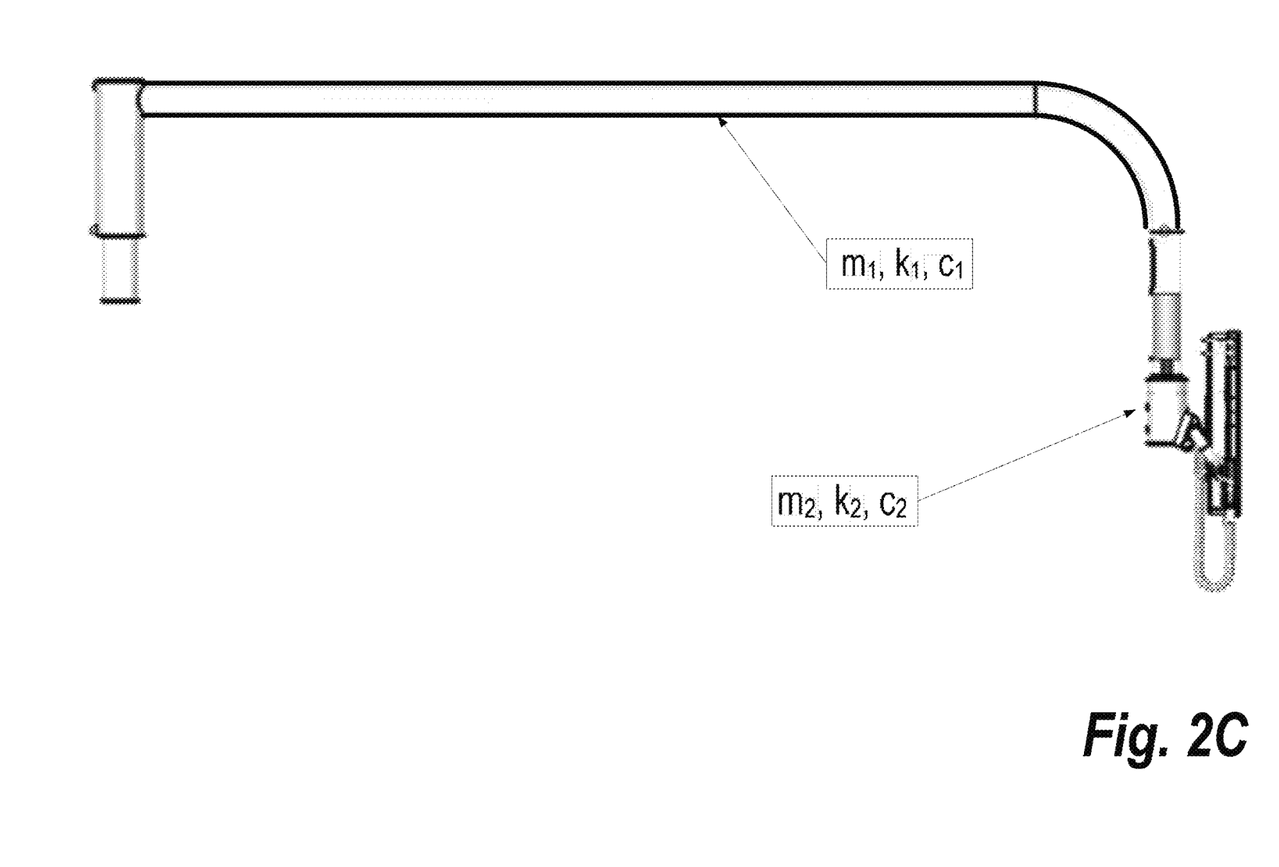
FIG. 2C illustrates how these the vibration characteristics described with respect to FIG. 1 are applied to the example cantilever structure shown in FIGS. 2A and 2B.

FIG. 2C illustrates how these the vibration characteristics described above with respect to FIG. 1 are applied to the example Cantilever Structure 200. Here, the vibration characteristics of the Cantilever Structure 200 (denoted by $m_1$, $k_1$, $c_1$) are shown in the Horizontal Section 210. The vibration characteristics of the Harmonic Absorber 220 (denoted by $m_2$, $k_2$, $c_2$) are tuned to counteract the vibration characteristics of Cantilever Structure 200 and, thus reduce the amplitude and duration of mechanical vibrations in the structure 200. More specifically, the values of $m_2$ and $k_2$ are selected so that the moving part(s) of the Harmonic Absorber 220 (see FIG. 3 for an internal view) are tuned to a specific structural frequency of the Cantilever Structure 200. For example, in one embodiment, the Harmonic Absorber 220 is tuned to the first natural frequency of the cantilevered structure. When the specific frequency is excited, the Harmonic Absorber 220 will resonate out of phase with the structural motion, thus counteracting vibration in the Cantilever Structure 200.

It should be noted that the harmonic absorber can easily be tuned for changes between and among imaging systems. Techniques for tuning harmonic absorbers are generally known in the art and, thus are not described in detail herein. In general, the technique for tuning will depend on the type of harmonic absorber employed. For example, for a mass and spring harmonic absorber (see FIG. 3 below), tuning can be performed by adjusting the mass and/or characteristics of the spring (e.g., wire diameter, outer diameter, length, and number of total coils) while monitoring vibrations in the Cantilever Structure 200.

Figure 3:
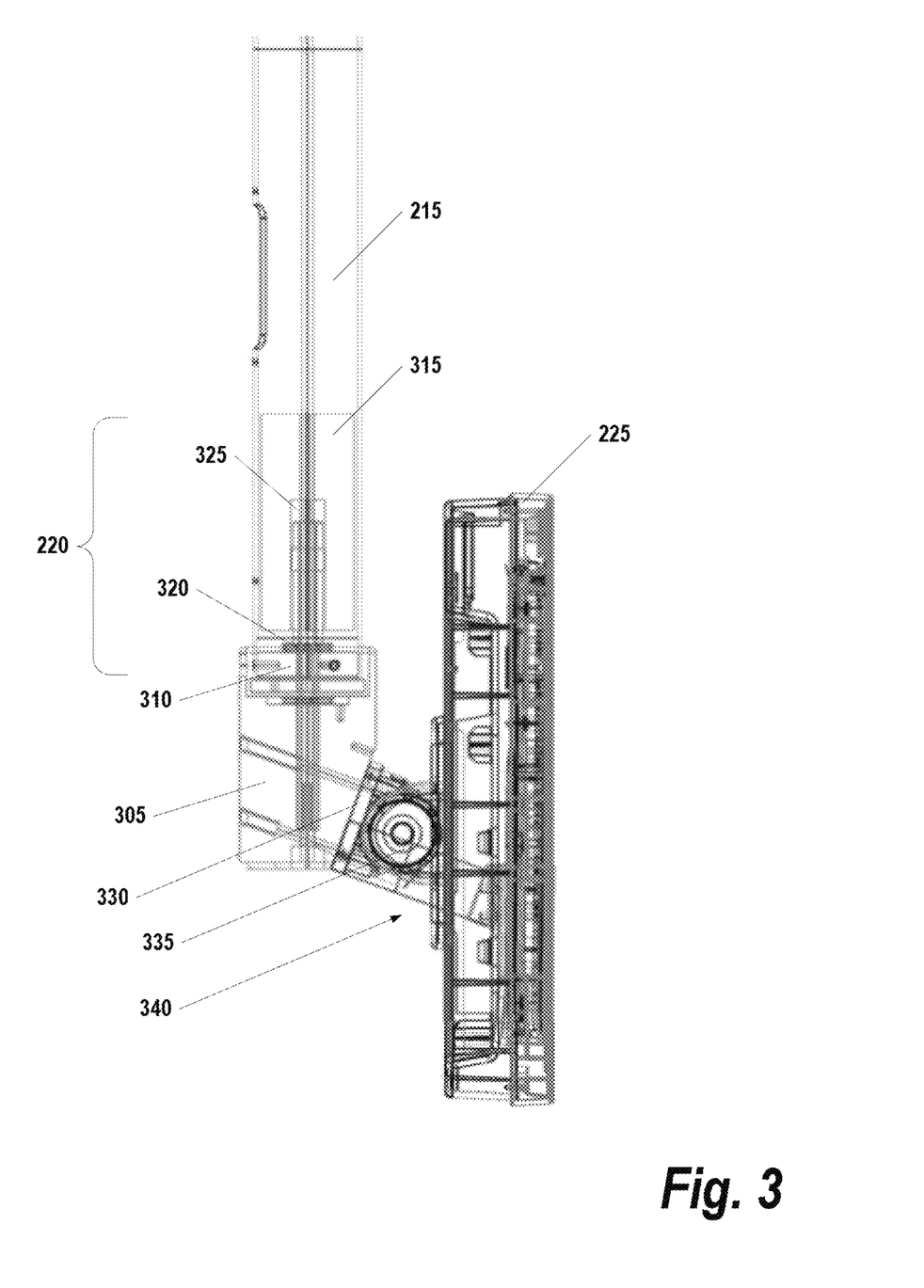
FIG. 3 provides a detailed internal view of the distal end of the cantilever structure shown in FIGS. 2A-2C, according to some embodiments.

FIG. 3 provides a detailed internal view of the distal end of the Cantilever Structure 200, according to some embodiments. In this example, the Harmonic Absorber 220 comprises a Mass 315 and a Spring 320. A Guiding Rod 325 that positions the Mass 315 with respect to the Spring 320. The Harmonic Absorber 220 is internal to the Curved Boom Arm Section 215 and a Hub 305 connected to the Curved Boom Arm Section 215 using a Nut Adapter 310. The Hub 305 includes a Knuckle Adapter 330 that connects with a Knuckle Ball Joint 335 on the Housing 340 of the Monitor Assembly 225. The two-piece Harmonic Absorber 220 (i.e., mass and spring) provides a simple and modular solution which can be located internal to the Cantilever Structure 200. Thus, vibration dampening can be easily added to existing cantilever structures without substantial modifications in their design. In other embodiments, all or part of the Harmonic Absorber 220 may be located and connected externally to the Cantilever Structure 200, such as to the Curved Boom Arm Section 215.

Figure 4:
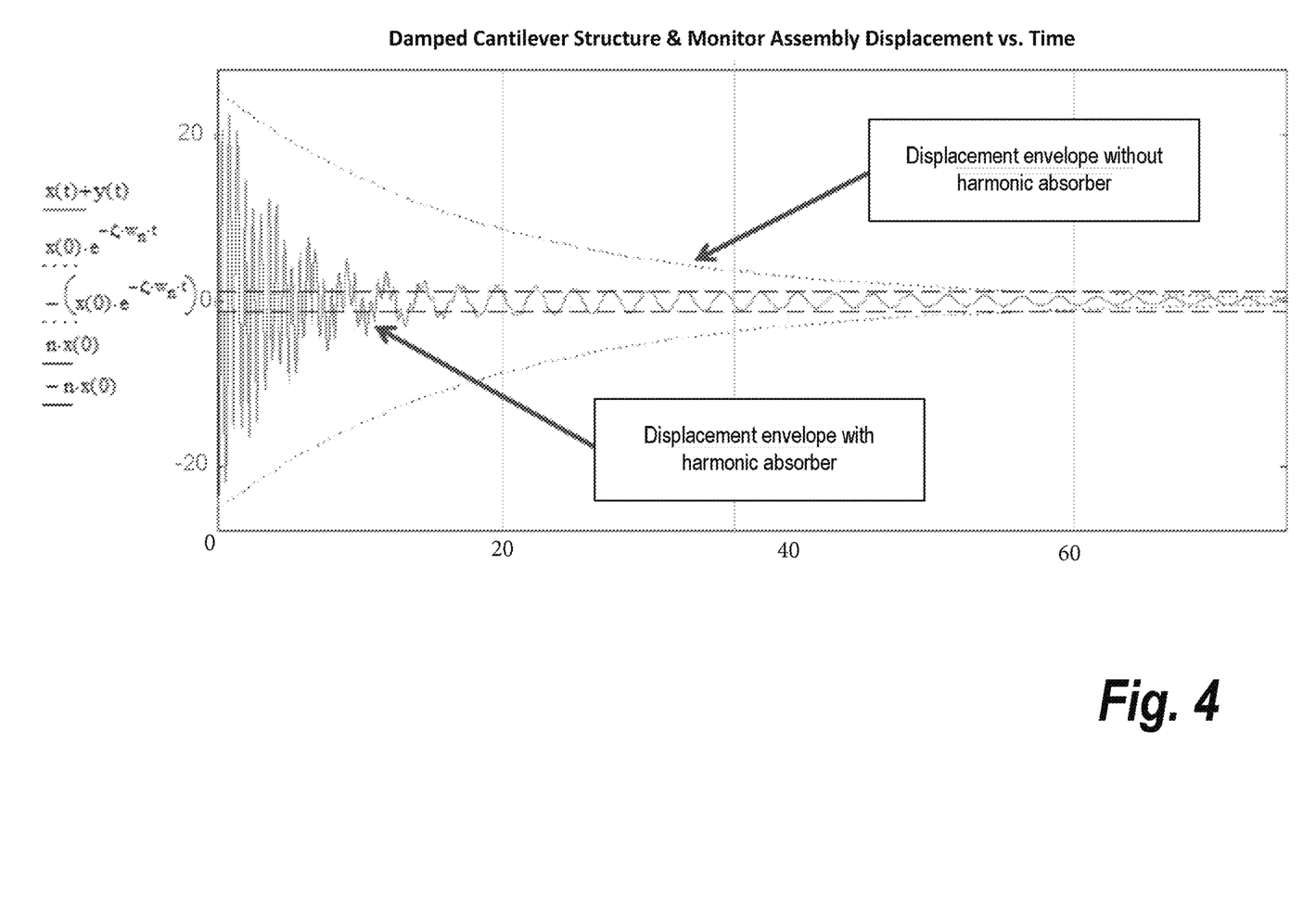
FIG. 4 shows the mathematical model of displacement vs. time for complete assembly.

FIG. 4 shows the mathematical model of displacement vs. time for the complete assembly. The figure also shows the displacement envelope of cantilever assembly without harmonic damper. As shown in the FIG. 4, precise tuning of the harmonic absorber (adjusting mass and stiffness) significantly reduces the magnitude and duration of structural vibration. Thus, vibration of the monitor assembly is significantly reduced and user experience is improved.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The system and processes of the figures are not exclusive. Other systems and designs may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. No claim element herein is to be construed under the provisions of 35 U.S.C. 112(f) unless the element is expressly recited using the phrase "means for."

We claim:

1. A system comprising:
   a hub configured to support a device;
   a cantilever structure anchored at an anchor end and coupled to the hub at a distal end, wherein use of the device supported by the hub imparts vibrations in the cantilever structure; and
   a harmonic absorber comprising a tuned mass damper located inside the distal end of the cantilever structure before the hub, wherein the harmonic absorber is tuned to a structural frequency of the cantilever structure such that the vibrations in the cantilever structure are damped.

2. The system of claim 1, wherein the cantilever structure comprises:
an anchor section located at the anchor end of the cantilever structure and extending in a vertical direction,
a horizontal section connected to the anchor section, and
a curved boom arm section connected to the horizontal section and located at the distal end of the cantilever structure.

3. The system of claim 2, wherein the harmonic absorber is positioned internal to the curved boom arm section.

4. The system of claim 2, wherein the anchor section is connected to an upper exterior surface of an imaging system.

5. The system of claim 2, wherein (a) the anchor section of the cantilever structure is connected to an imaging system at an anchor point and (b) the cantilever structure is rotatable around the anchor point.

6. The system of claim 2, wherein the hub is located at a distal end of the curved boom arm section, wherein at least a portion of the harmonic absorber is positioned internal to the curved boom arm section.

7. The system of claim 6, wherein the device is a monitor assembly that allows a user to interact with an imaging system.

8. The system of claim 7, wherein the monitor assembly comprises a housing with a knuckle ball joint and the hub section comprises a knuckle adapter for connecting the hub section to the knuckle ball joint.

9. The system of claim 1, wherein the device is a monitor assembly.

10. The system of claim 1, wherein the harmonic absorber comprises:
a mass,
a spring, and
a guide rod to position the mass with respect to the center of the spring.

11. The system of claim 1, wherein the structural frequency is the first natural frequency of the cantilever structure.

12. A system for dampening vibrations in a cantilevered structure, the system comprising:
the cantilevered structure having a tubular structure;
a hub configured to support a device from the cantilevered structure;
a single axis harmonic absorber positioned inside a distal end of the cantilevered structure before the hub, comprising:
a mass,
a spring, and
a guide rod to position the mass with respect to the center of the spring,
wherein the single axis harmonic absorber is tuned to a structural frequency of the tubular structure such that the vibrations in the tubular cantilever structure are damped.

13. The system of claim 12, wherein the structural frequency is the first natural frequency of the cantilever structure.

14. A system comprising:
an imaging device;
a cantilever structure anchored to the imaging device and having a hub at a distal end which is configured to support an input device; and
a harmonic absorber inside the distal end of the cantilever structure before the hub, wherein the harmonic absorber is tuned to a structural frequency of the cantilever structure such that the vibrations in the cantilever structure are damped.

15. The system of claim 14, wherein the cantilever structure comprises:
an anchor section connected to the imaging device and extending in a vertical direction with respect to an upper exterior surface of the imaging device,
a horizontal section connected to the anchor section, and
a curved boom arm section connected to the horizontal section and located at a distal end of the cantilever structure.

16. The system of claim 15, wherein at least a portion of the harmonic absorber is positioned internal to the curved boom arm section.

17. The system of claim 14, wherein the input device includes a monitor assembly attached to the distal end of the cantilever structure with respect to the imaging device.

18. The system of claim 14, wherein the harmonic absorber comprises:
a mass,
a spring, and
a guide rod to position the mass with respect to the center of the spring.

19. The system of claim 14, wherein the structural frequency is the first natural frequency of the cantilever structure.

* * * * *